United States Patent [19]

Horbaschek

[11] 4,412,247
[45] Oct. 25, 1983

[54] X-RAY DIAGNOSTIC INSTALLATION COMPRISING AN IMAGE INTENSIFIER TELEVISION CHAIN

[75] Inventor: Heinz Horbaschek, Erlangen, Fed. Rep. of Germany

[73] Assignee: Siemens Aktiengesellschaft, Berlin & Munich, Fed. Rep. of Germany

[21] Appl. No.: 227,464

[22] Filed: Jan. 22, 1981

[30] Foreign Application Priority Data

Feb. 11, 1980 [DE] Fed. Rep. of Germany ....... 3004977
May 29, 1980 [DE] Fed. Rep. of Germany ....... 3020464

[51] Int. Cl.³ ............................................. H04N 5/32
[52] U.S. Cl. .................................. 358/111; 358/167; 378/99
[58] Field of Search ................. 358/36, 111, 167, 219, 358/223, 211; 250/416 TV; 378/99

[56] References Cited

U.S. PATENT DOCUMENTS

| | | | |
|---|---|---|---|
| 3,280,253 | 10/1966 | McMaster et al. | 358/111 |
| 3,875,584 | 4/1975 | Fletcher et al. | 358/36 |
| 3,919,467 | 11/1975 | Peugeot | 358/111 |
| 4,064,530 | 12/1977 | Kaiser et al. | 358/36 |
| 4,123,786 | 10/1978 | Cramer | 358/111 |
| 4,141,043 | 2/1979 | Liu | 358/219 |
| 4,160,266 | 7/1979 | Kurihara | 358/111 |

OTHER PUBLICATIONS

A. Gebauer, "X-ray Television," 2nd Edition, Georg–Thieme–Publisher, Stuttgart, 1974, title page and p. 69.
W. Dillenburger, "Television Measurement Technique," 3rd Edition, Specialized Publishing House, Schiele & Schön GmbH, Berlin, title p. and pp. 234–236.

Primary Examiner—Joseph A. Orsino, Jr.
Attorney, Agent, or Firm—Hill, Van Santen, Steadman & Simpson

[57] ABSTRACT

In an exemplary embodiment, an image intensifier television chain includes an X-ray image intensifier, an optical coupler, a television pickup tube, a central unit for controlling the scanning beam of the television pickup tube, and a video amplifier for the picture signal. Between the video amplifier and an image memory, which is controlled by the central unit, a switch is arranged which is controllable by a control device in such a manner that the storage of an image takes place following a specified number of scannings of the target of the television pickup tube.

9 Claims, 6 Drawing Figures

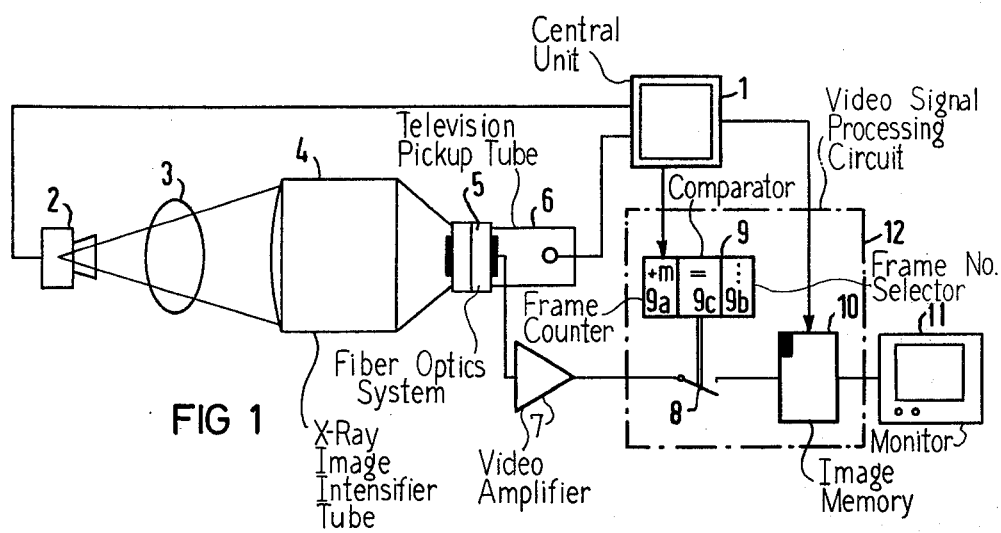
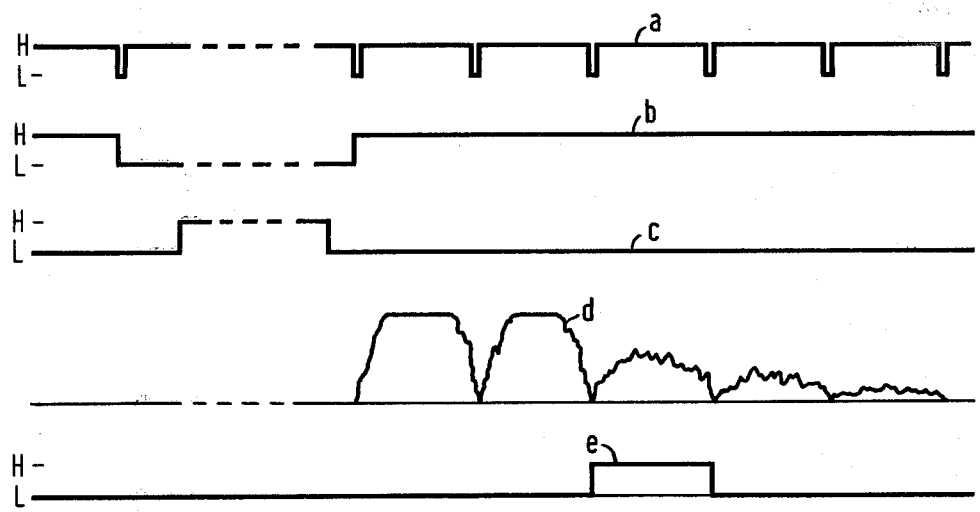
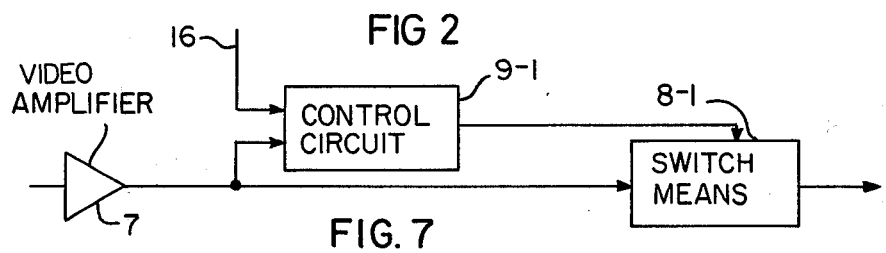

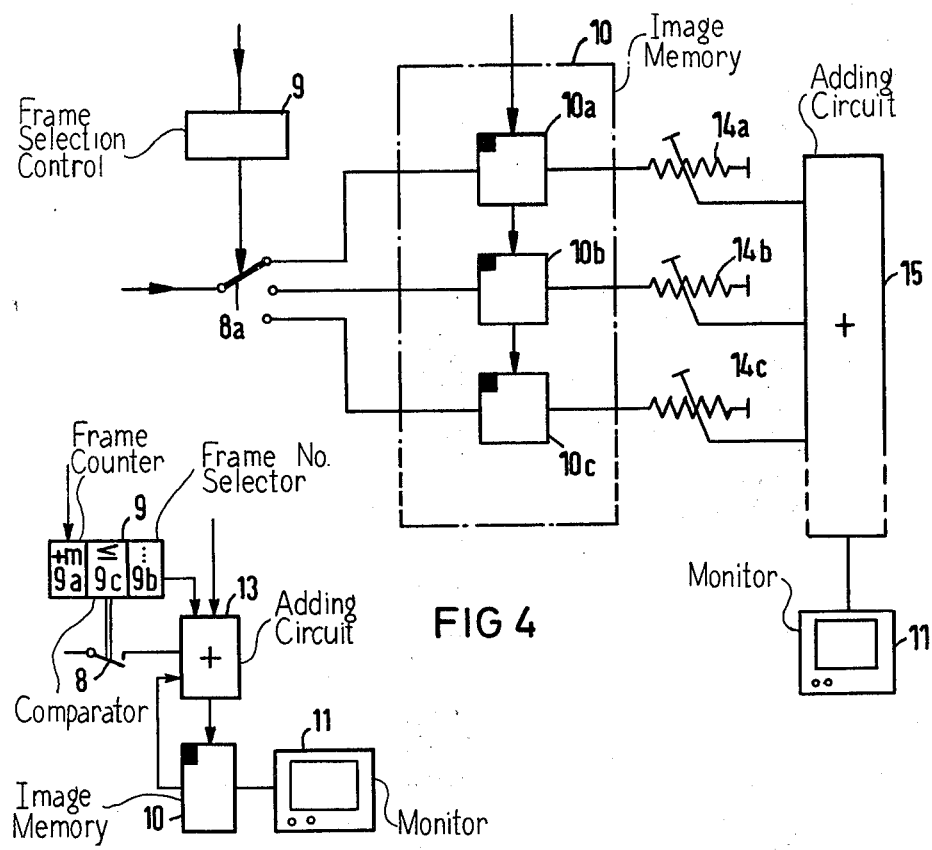
FIG 4
FIG 3
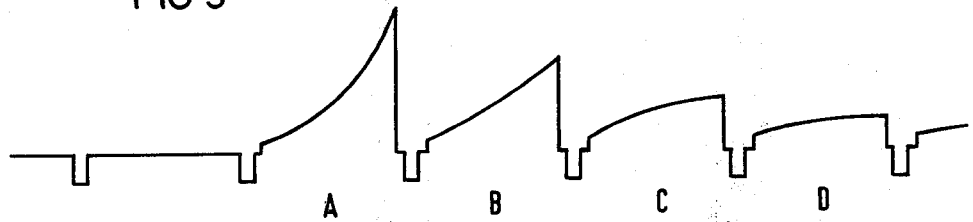
FIG 5
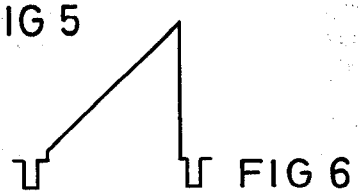
FIG 6

X-RAY DIAGNOSTIC INSTALLATION COMPRISING AN IMAGE INTENSIFIER TELEVISION CHAIN

BACKGROUND OF THE INVENTION

The invention relates to an X-ray diagnostic installation comprising an image intensifier television chain which exhibits an x-ray image intensifier, an optical coupler, a television pickup tube, a central unit for controlling the scanning beam of the television pickup tube, a video amplifier for the picture signal, an outlet-connected image memory, which is likewise controlled by the central unit, and a monitor. Diagnostic installations of this type are employed for the purpose of transilluminating patients predominantly in the case of intermittent fluoroscopy, or for the purpose of preparing electric immediate (or no-delay) images; i.e., individual images.

In the case of a known X-ray diagnostic installation of the type initially cited (book "X-Ray Television" by A. Gebauer, 2nd Edition, Georg-Thieme-Publisher, Stuttgart, 1974, pages 53 and following), there is connected, between the X-ray image intensifier and the television pickup tube, for example of the vidicon type, an optical lens system which makes it possible, by means of stopping down, to adapt in its brightness the image to be picked up by the television pickup tube such that the television pickup tube is not overdriven, i.e., such that the charge potential of the target of the television pickup tube can be completely reversed in charge by the scanning beam.

In the case of the coupling of the television pickup tube to the X-ray image intensifier by means of a fiber optic system (book by Gebauer cited above, pages 68 and following), which is already in frequent use today, the possibility does not exist of stopping down by means of a mechanical diaphragm. Here, other approaches must be embarked upon for the purpose of adaptation of the brightness of the X-ray image to the television pickup tube.

A known possibility (see the book "Measurement Technique" of W. Dillenburger, 1972, published Schiele & Schön, Berlin, page 236) is an increase in the beam current intensity of the scanning beam, which, however, can proceed only up to a limit, the maximum current intensity, since otherwise the distortions increase too greatly. If the maximum beam current intensity is not sufficient for the complete charge reversal of the target, then the television pickup tube becomes overdriven and delivers an X-ray image which is too bright and poor in detail. In order to prevent overdriving, the X-ray dose rate must be reduced. Since, however, the quantum noise in the X-ray image has a more conspicuous and interfering effect the lower the dose rate, the quality of the X-ray image is thereby considerably reduced.

Recently, light flux diaphragms have been employed for fiber-optics (German Patent Application No. 2,846,295), which are comprised of a layer which is electrically controllable in its transparency. An adaptation of the brightness of the X-ray image to the following television pickup tube is hereby, indeed, possible. However, the arrangement of such a diaphragm in the optical path of rays and the electric control necessary to this end are very costly.

In the case of individual image operation of a television pickup tube, gamma-distortions in the scanning occur. In the case of dark image portions the brightness differences appear compressed. This effect is determined by the brightness-dependent charge reversal inertia (or lag) of the television pickup tube which is clearly greater for dark image portions, which generate only a low charge potential on the target, than for bright image portions. This effect occurs most strongly in the first scanning. Also, the electric signal-to-noise ratio for small signal levels is thereby smaller, so that an electronic correction of the gamma-distortion does not appear to make good sense.

SUMMARY OF THE INVENTION

The invention proceeds from the object of creating a generic X-ray diagnostic installation which, in utilizing a simple fiber optics system, renders possible the increase in the X-ray dose, such that a qualitatively superior X-ray image results which is virtually free of gamma-distortions.

In accordance with the invention, the object is achieved in that a switch is provided between the video amplifier and the image memory, which switch is controllable by a control device in such a manner that the storage of an image takes place subsequent to a specified number of scannings of the target of the television pickup tube, respectively. As a consequence of this, the excessively bright image overdriving the television pickup tube is stopped down electronically through multiple scanning so that a satisfactory image appears on the monitor.

The scanning characteristic curve can be linearized and the distortions can be reduced if the control device is so designed that only scanned images with an odd number are stored. A simple construction can be obtained if the control device is designed as a frame exposure counter which is provided with means for the manual preselection of the image to be stored, respectively. A versatile adaptation to varyingly bright X-ray images can be achieved in that the central unit exhibits means for controlling the beam current intensity of the television pickup tube in dependence upon the picture signal. An automatic adaptation to the respective X-ray image brightness can be achieved in that the control device is connected with the output of the video amplifier and brings about the storage, in dependence upon the picture signal, when the maximum amplitude of the picture signal falls below a specified value.

The gamma-distortions can be particularly greatly reduced if an adding circuit is present which, for every image point, weights the image point data from different scannings and adds the weighted data for the formation of a sum signal for every image point. A simple and problem-free operation is obtained if the programming installation is connected with the adding circuit, so that, dependent upon its adjustment, also the weighting of the video signals is determined. An independent influencing of the video signals is rendered possible if adjustment means, separated from the programming installation, are present for the preselection of the scannings to be processed in the adding circuit and for the weighting of the video signals. A particularly simple construction can be obtained if the adding circuit is so designed that the memory positions of the image memory are sampled synchronously with the scannings, that the video signal of the television camera, as well as that of the image memory, are added in weighted fashion, and that the output signal of the adding circuit is read into the image memory. The individual scannings can be advantageously added in weighted fashion if the switch is designed as a multiple changeover switch whose outputs are guided to several individual memories, and if the outputs of the individual memories are connected with adjustment means for the weighting, whose output signals are superimposed in an adding stage and supplied to the monitor.

The invention shall be explained in greater detail below on the basis of an exemplary embodiment illustrated on the accompanying sheets of drawings; and other objects, features and advantages will be apparent from this detailed disclosure and from the appended claims.

BRIEF DESCRIPTION OF THE DRAWINGS

FIG. 1 illustrates a block circuit diagram of an inventive X-ray diagnostic installation;

FIG. 2 illustrates time progressions for the purpose of explaining FIG. 1;

FIG. 3 illustrates a block circuit diagram of a circuit component of the X-ray diagnostic installation in accordance with FIG. 1;

FIG. 4 illustrates a block circuit diagram of a variant of the circuit component according to FIG. 3;

FIGS. 5 and 6 illustrate time progressions of the scanned video signal for the purpose of explaining FIGS. 3 and 4; and FIG. 7 is a diagrammatic illustration of a modification of the embodiment of FIG. 1.

DETAILED DESCRIPTION

In FIG. 1, a central unit 1 is illustrated which controls the exposure values of an X-ray tube 2, in whose path of rays a patient 3 is disposed. The radiation image generated on the inlet screen of an X-ray image intensifier 4 is reproduced in intensified fashion on the outlet fluorescent screen. A fiber optics system 5 conducts the visible light to the light-sensitive (or photosensitive) layer, the target, of the television pickup tube 6 of the vidicon type whose scanning beam is controlled by the central unit 1 in its intensity and deflection. The charge potential resulting on the target of the television pickup tube 6 after the exposure is scanned by the scanning beam, tapped, and is conducted via a video amplifier 7 to a switch 8 forming the input of a processing circuit 12 for the scanned video signal. A control device 9 which, in this instance, includes frame counter 9a, a programming installation 9b, and a comparator 9c, actuates the switch 8. The frame counter 9a of the control device 9 receives its counting pulses from the central unit 1. The through-connected picture signal is supplied to an image memory 10 whose function is controlled by the central unit 1. The output of the processing circuit 12 is connected to a monitor 11 for the purpose of observation of the X-ray images.

The method of operation of this circuit is to be explained on the basis of the functional sequences illustrated in FIG. 2. The central unit 1 generates the television picture frequency which is represented by waveform a as a synchronization- and counting-clock pulse. If a single image exposure is to take place, then the scanning beam of the vidicon is blocked by the central unit 1. This function is represented by the waveform b. The H-value here signifies the connected (or switched-on) scanning, whereas the L-value indicates the blockage of the scanning beam. Simultaneously, the frame counter is set to zero. Subsequently, the exposure takes place whose duration and intensity vary and depend upon the subject to be transilluminated. The exposure duration is rendered by the H-value of the curve c.

The X-radiation which has penetrated the patient 3 generates an image on the inlet screen of the X-ray image intensifier 4 which appears intensified on its outlet screen. Via the fiber optics system 5 a charge distribution corresponding to the image is generated on the target of the vidicon. After switching off the X-radiation, the scanning of the charge potentials on the target takes place by means of switching-on of the beam current in the case of the next-following clock pulse (waveform b); a voltage, which is dependent upon the respective potential, thereby reaches the output of the vidicon whose progression is illustrated in waveform d. It can be clearly recognized that the picture signals of the first two scannings are cut off at the top. This signifies that a complete charge reversal of the target could not take place since the maximum charge potential was too great. These two signal progressions are thus unusable for the purpose of storage. The voltage progression of the third image provides a usable picture signal, whereas the following are too weak. The usable third picture signal, after amplification in the video amplifier 7, is stored in the image memory 10 in that the switch 8 is closed, given equality of the counter-reading in the frame counter and of the frame number selected in the programming installation 9b, and, subsequent to termination of the memory operation, said switch is opened again. This is clarified by the memory accept pulse illustrated at e. The stored image is reproduced on the monitor 11. In this manner, a qualitatively satisfactory X-ray image appears on the viewing screen within the shortest time in spite of an increased X-ray dose rate and the lack of a stopping-down mechanism.

This "electronic stopping-down" through multiple scanning of the target can be advantageously utilized in the case of television pickup tubes with a relatively high charge reversal inertia (or lag). These properties are exhibited, in particular, by television pickup tubes of the vidicon type. However, principally, also tubes of every other type are suitable.

In FIG. 3 a variant of the processing circuit 12 is illustrated. The frame counter 9a of the control device 9 receives its counting pulses from the central unit 1. Those scannings in the case of wh ich a scanned image is to be processed are predetermined by the programming installation 9b. The values of the frame counter 9a and of the programming installation 9b are compared in the comparator 9c. If the value of the frame counter is smaller than or equal to the value adjusted in the programming installation 9b, then the switch 8 is closed and the video signal is supplied to the adding circuit 13. If, by contrast, the value in the frame counter 9a is greater, the switch 8 opens and interrrupts the signal flow.

The adding circuit 13 synchronously sums, in weighted fashion, the video signal of the video amplifier 7 and the video signal of the preceding scannings which are stored in the image memory 10. The sum is again read into the image memory 10, so that the sum signal is available for further processing. If the number of desired scannings is attained, the switch 8 is opened, the adding circuit 13 is blocked, and the image storage operation of the image memory 10 is stopped. The stored image is reproduced (or displayed) on the monitor 11.

In FIG. 4 an additional embodiment of the processing circuit 12 is illustrated.

The switch 8a, controlling supply of the video signal, is here designed in the form of a multiple changeover switch (step switch) with, in this instance, three outputs. Connected to the outputs of the switch 8a are individual memories 10a, 10b, and 10c, etc., which together form an image memory 10. The individual memories 10a, 10b, 10c are synchronized by the central unit 1. The outputs of the memories are connected with adjustment means 14a through 14c, designed as potentiometers, which are connected to an adding stage 15. The output of the adding stage 15 is connected to the monitor 11.

After completion of the exposure, the target of the vidicon is scanned. The video signal is supplied via the video amplifier 7 to the step switch 8a which is operated by the control device 9 so that the individual image frames are successively supplied to the inputs of the individual memories 10a through 10c, etc. The central unit 1 delivers the memory commands to control device 9 for selecting the individual memories. If the image memory 10 is full; i.e., if all desired scannings are stored, the output signals are individually weighted via potentiometers and are supplied via the adding stage 15 to the monitor 11 in the form of a sum signal. A television image results there which now only contains very minor distortions.

In FIG. 5 the video signal of a plurality of scannings of an individual image is represented. An optical wedge serves as the test image, which optical wedge generates a rectilinearly rising video signal as illustrated in FIG. 6. As already described on the basis of FIG. 2, in FIG. 5 the scanning beam is initially blocked, so that no image information results. After exposure, the scanning beam is again switched on. The curve section A of the video signal pertains to the first scanning. One clearly recognizes that the curve section appears downwardly curved, although it actually should rise in a rectilinear fashion. The curve section B is still somewhat curved downwardly. Moreover, the amplitude, in the case of a specific prescribed beam current intensity, now only amounts to approximately 0.6 times the original maximum amplitude. This signifies that, although the response curve has become more linear, the signal-to-noise ratio has become poorer. In the following curve sections C and D, the amplitudes become even smaller, but the distortions occur inverted, since the greatest portion of the charges of the bright image portions has been reversed on account of slight inertia, whereas the dark portions become only slightly reversed.

Through a summation of the first two scannings it has been made possible that the gamma-distortion relative to the first scanning is, indeed, decreased, but that no optimally rectilinear progression is yet provided. The signal-to-noise ratio is improved since the noise, with doubling of the useful signal, is amplified only by the factor of $\sqrt{2}$.

If, by contrast, for example, the first three scannings (A, B and C, FIG. 5) are weighted and added, then one obtains as output signal approximating the original signal illustrated in FIG. 6. If the scanning beam is adjusted to be stronger or weaker, it is found to be expedient to add, for example, the third, fourth and fifth scanning. This can be achieved by means of the programming installation 9b on the control device 9.

The weighting of the individual signals can be brought about in different ways. In the embodiment of the processing circuit 12 described in FIG. 4, the picture signals are stored and can subsequently be weighted by the adjustment means 14a through 14c, with simultaneous visual control. A fixed optimum adjustment as well as an adjustment which is controllable by the programming installation 9 is also conceivable here.

In the embodiment illustrated in FIG. 3, it appears to be most expedient to add the input signal without attenuation and the signal, fed back by the memory, in weighted fashion. However, also both signals can be weighted with the same or different factors. A fixed coupling of the weighting factors with the programming installation provides a considerable simplification of the operation of the X-ray diagnostic installation.

In the case of individual (or single) image scanning there occurs—conditioned by the charge reversal inertia—a gamma-distortion; i.e., the advantageously scanned image locations with great brightness yield a superproportionally large signal, the dark image locations appear compressed. Through the multiple scanning in the case of the described method, this gamma-distortion in the picture signal is partially eliminated. In addition, through the arrangement, the signal-to-noise ratio is improved and the signal irregularities are decreased which, for example, are brought about by the non-uniform layer construction of the vidicon target or the varying sharpness distribution of the scanning beam over the image sharpness. The aging of the television pickup tube can likewise be compensated.

In order to reduce the brightness variations over the image surface, which are possible in the case of individual image scanning, it has proven advantageous, in the case of utilization of a television system with interlaced images, to store only the images with odd numbers. This can be taken into account in the programming installation 9b of the control device 9 in that programming means are provided only for the odd image numbers.

Within the framework of the invention also further embodiments are conceivable. Thus, for example, the control device may exhibit an automatic system as indicated at 9-1 in FIG. 7 which scans the picture signal from video amplifier and compares it with a specified, system-specific value at input 16. If the maximum amplitude of the signal of an image falls below this value, then this image is stored by actuating switch means 8-1. It is also additionally possible here to establish the further condition that only the images with odd numbers be stored. This automatic system can be operated alone or disconnectibly together with the programming installation 9b.

Through the inventive embodiment of an X-ray diagnostic installation it is made possible, without having to give up the advantages of the simple construction of a fiber optics system, to obtain a television image of high quality which is almost entirely freed of noise which, conditioned by the linearization of the gamma-function and on account of the improvement of the signal-to-noise ratio relative to the quanta noise, in particular, in the case of the dark picture portions, is distinguished by a high resolution of the gray levels.

It will be apparent that many modifications and variations may be effected without departing from the scope of the novel concepts and teachings of the present invention.

I claim as my invention:

1. An X-ray diagnostic installation, comprising an X-ray tube, an X-ray image intensifier, an optical coupler, a television pickup tube, a central unit for the control of the radiographic exposure values of the X-ray tube, a video amplifier coupled with the pickup tube for amplifying the image signal, switch means, an image memory operable for storing an image-representing segment of the image signal under the control of the switch means and being controlled by the central unit, and a monitor, control means connected with the central unit and with the switch means and operable for actuating the switch means to control the selection of a segment of the image signal which is to be supplied from the video amplifier and stored by the image memory as a selected image, the central unit being operable to block the X-ray tube after completed exposure of the target of the television pickup tube, and the switch means being controlled by the control means in such a fashion that the storage of an image proceeds in each instance only after a number of scannings of the target of the television pickup tube, the control means being connected with the output of the video amplifier and controlling the switch means, in dependence upon the image signal, so as to effect storage when the maximum amplitude of the image signal falls below a specified value.

2. An X-ray diagnostic installation according to claim 1, with the control means (9) being operative to control said switch means (8) such that only scanned images with an odd number are stored.

3. An X-ray diagnostic installation according to claim 1, with the control means (9) comprising a frame counter (9a) having means (9b) for the manual preselection of the image to be stored.

4. An X-ray diagnostic installation according to claim 1, with the central unit (1) comprising means for controlling the beam current intensity of the television pickup tube (6) in dependence upon the image signal.

5. An X-ray diagnostic installation according to claim 1, with an adding circuit being connected to the image memory and being operable for every image point to weight the image point data from different scannings and to add the weighted data for the formation of a sum signal for every image point.

6. An X-ray diagnostic installation according to claim 5, with said control means comprising a programming installation (9b) connected with the adding circuit (13) for controlling the weighting of the image signals.

7. An X-ray diagnostic installation according to claim 5, with adjustment means (14a, 14b, 14c), separate from the control means, being connected between the image memory and the adding circuit for the weighting of the image signals.

8. An X-ray diagnostic installation according to claim 5, with the adding circuit (13) being operable such that the memory positions of the image memory (10) are sampled synchronously with the scannings, that the image signal of the television pickup tube as well as that of the image memory (10) are added in weighted fashion, and that the output signal of the adding circuit (13) is read into the image memory (10).

9. An X-ray diagnostic installation according to claim 5, the switch means being a multiple changeover switch (8a) having a plurality of outputs, the image memory comprising respective individual memory sections having inputs connected with the respective outputs of said changeover switch, and having respective outputs, adjustment means (14a, 14b, 14c) connected with the respective outputs of the respective individual memory sections (10a, 10b, 10c) for weighting of the image signals supplied by said memory sections, and for supplying weighted output signals to said adding circuit (15), the adding circuit (15) having an output for supply of a resultant image signal to the monitor (11).

* * * * *